United States Patent
Kozloski et al.

(10) Patent No.: US 10,732,705 B2
(45) Date of Patent: Aug. 4, 2020

(54) INCREMENTAL ADAPTIVE MODIFICATION OF VIRTUAL REALITY IMAGE

(71) Applicant: International Business Machines Corporation, Armonk, NY (US)

(72) Inventors: James R. Kozloski, New Fairfield, CT (US); Ravi Tejwani, Cambridge, MA (US); George Doerre, Poughkeepsie, NY (US); Neeraj Asthana, Acton, MA (US); Thomas Chefalas, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/204,073

(22) Filed: Nov. 29, 2018

(65) Prior Publication Data
US 2020/0174551 A1 Jun. 4, 2020

(51) Int. Cl.
*G06F 3/01* (2006.01)
*G06T 19/00* (2011.01)
*G06N 20/00* (2019.01)

(52) U.S. Cl.
CPC ............. *G06F 3/011* (2013.01); *G06F 3/016* (2013.01); *G06N 20/00* (2019.01); *G06T 19/006* (2013.01)

(58) Field of Classification Search
CPC ....... G06T 19/006; G06F 3/011; G09B 9/063; G09B 9/24; G09B 9/307
See application file for complete search history.

(56) References Cited

U.S. PATENT DOCUMENTS 5,679,004 A 10/1997 McGowan et al.
5,846,086 A 12/1998 Bizzi et al.
(Continued)

FOREIGN PATENT DOCUMENTS

WO 2015007296 A2 1/2015
WO 2017021321 A1 2/2017

OTHER PUBLICATIONS

Eaves et al., "The short-term effects of real-time virtual reality feedback on motor learning in dance", Presence: Teleoperators and Virtual Environments, Special Issue: Virtual Reality and Sports, 2011, pp. 62-77.
(Continued)

*Primary Examiner* — Jeffery A Brier
(74) *Attorney, Agent, or Firm* — Cantor Colburn LLP; Joseph Petrokaitis

(57) ABSTRACT

A system and method to perform incremental adaptive modification of a virtual reality image involve obtaining sensor measurements from sensors coupled to an individual who is performing a task while viewing the virtual reality image. The method includes generating a true model of the individual from the sensor measurements, comparing the true model with an expert model obtained from another individual performing the task, and developing a lesson plan based on determining a difference between the true model and the expert model. The developing the lesson plan includes determining a gradient of intermediate models within the difference. A different one of the intermediate models is included iteratively along the gradient from the true model to the expert model in the virtual reality image.

20 Claims, 2 Drawing Sheets

(56) References Cited

U.S. PATENT DOCUMENTS

| | | | |
|---|---|---|---|
| 6,211,451 B1* | 4/2001 | Tohgi | G09B 5/065 |
| | | | 434/323 |
| 6,774,885 B1 | 8/2004 | Even-Zohar | |
| 2007/0016265 A1 | 1/2007 | Davoodi et al. | |
| 2011/0043537 A1 | 2/2011 | Dellon et al. | |
| 2013/0288222 A1* | 10/2013 | Stacy | G09B 5/00 |
| | | | 434/362 |
| 2014/0162224 A1* | 6/2014 | Wallace | G09B 5/06 |
| | | | 434/219 |
| 2016/0266645 A1 | 9/2016 | Marozau et al. | |

OTHER PUBLICATIONS

Ehrsson et al., "Touching a rubber hand: feeling of body ownership is associated with activity in multisensory brain areas", Journal of Nauroscience, Mar. 9, 2005, pp. 1-21.

Kim et al., "Proprioception rehabilitation training system for stroke patients using virtual reality technology", 35th Annual International Conference of the IEEE EMBS, Jul. 3-7, 2013, pp. 4621-4624.

Todorov et al., "Augmented Feedback Presented in a Virtual Environment Accelerates Learning of a Difficult Motor Task", Journal of Motor Behavoir, Jun. 1997, vol. 29, Issue 2, pp. 1-19.

* cited by examiner

INCREMENTAL ADAPTIVE MODIFICATION OF VIRTUAL REALITY IMAGE

BACKGROUND

The present invention relates to virtual reality, and more specifically, to the incremental adaptive modification of a virtual reality image.

Virtual reality (VR) refers to a computer-generated interactive experience. Using a VR headset or multi-projected environment, an individual can experience images, sounds, and other sensations (e.g., haptic effects) that simulate the individual's presence in a virtual environment. In a VR headset, for example, the VR image seen by the individual changes based on movement (e.g., head turn) of the individual. In addition to seeing a virtual environment, some VR participants can also see themselves in the VR environment. Thus, a person participating in an activity (e.g., exercising, playing an instrument, playing a game) in the VR environment can see themselves performing the activity.

SUMMARY

Embodiments of the present invention are directed to systems and methods to perform incremental adaptive modification of a virtual reality image. The method includes obtaining sensor measurements from sensors coupled to an individual who is performing a task while viewing the virtual reality image, generating a true model of the individual from the sensor measurements, and comparing the true model with an expert model obtained from another individual performing the task. A lesson plan is developed based on determining a difference between the true model and the expert model. Developing the lesson plan includes determining a gradient of intermediate models within the difference. The method also includes iteratively including a different one of the intermediate models along the gradient from the true model to the expert model in the virtual reality image.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

As previously noted, a VR environment facilitates an interactive experience based, at least in part, on a virtual or simulated image. The image can include the VR participant. Sensors can monitor movement of the participant, and a model can be generated from the sensor measurements as a virtual version of the participant who is included in the VR image. When the actions that a participant takes are reflected in the VR image by the model of the participant, the participant can begin to take ownership of the model in the VR image. This is referred to as body transfer illusion and is illustrated by the rubber hand illusion. According to the illusion, when a person moves their left hand, for example, behind their back, a rubber hand is put in the place of their left hand where they can see it, and the same stimulation is applied both visibly to the rubber hand and invisibly to the real left hand, the person begins to think of the rubber hand as their left hand.

Turning now to an overview of aspects of the invention, embodiments of the invention take advantage of the body transfer illusion to correct or adjust physical actions or positions of a VR participant. Specifically, incremental adaptive modification of a virtual reality image is used to introduce a difference between an actual action or position of the VR participant and what is shown for the model of the participant in the VR environment. Because of the body transfer illusion, the VR participant can have a tendency to make adjustments to try to match real body position and motion to the model seen in the VR environment. Thus, over time, the VR participant's actions or positions can be modified to match a goal (e.g., an instructor or expert in the field).

Figure 1:
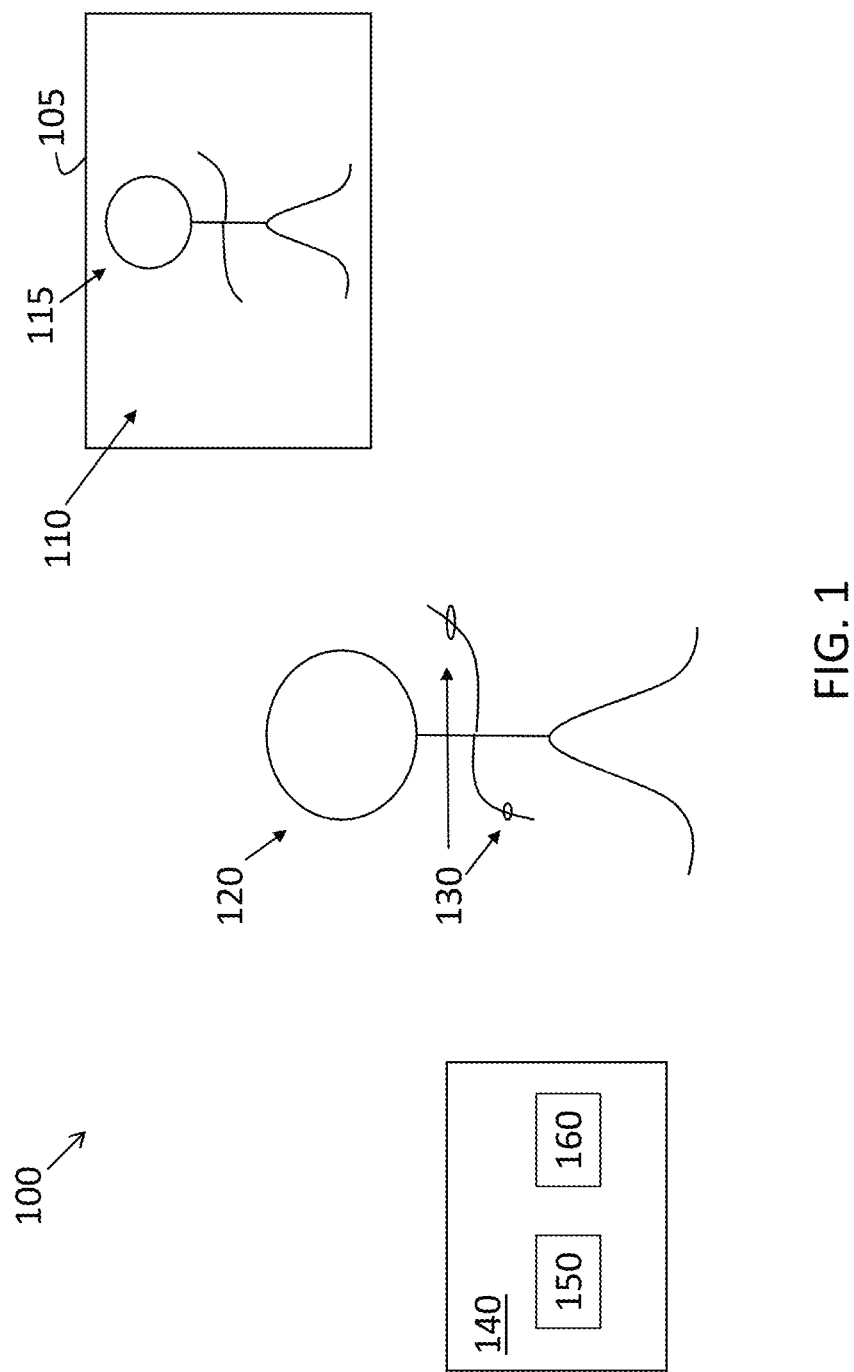
FIG. 1 is a block diagram of an exemplary Virtual reality (VR) system to perform incremental adaptive modification of a VR image according to one or more embodiments of the invention.

FIG. 1 is a block diagram of an exemplary VR system 100 configured to perform incremental adaptive modification of a VR image 110 according to one or more embodiments of the invention. While the VR image 110 can include text or other imagery, the model 115 of the VR participant 120 is of interest according to one or more embodiments of the invention. While a screen 105 is shown for explanatory purposes, the screen 105 can be incorporated as part of goggles, and the VR image 110 can instead be displayed by the goggles worn by the VR participant 120. The VR participant 120 is shown with exemplary sensors 130. Additional sensors 130 can be worn or attached at any number of locations on the VR participant 120. The sensors 130 can measure mechanical musculoskeletal movement (e.g., striated muscle tension, muscle spindles, tendons, fibrous connective tissue, joints). The sensors may also include video capture devices positioned to record the body position of the participant by a series of images.

The VR system 100 also includes a controller 140 that obtains information from the sensors 130 and generates the model 115 displayed in the VR image 110. The controller 140 includes processing circuitry such as, for example, one or more memory devices 150 and processors 160 to store and execute a computer program product. The processing circuitry of the controller 140 can implement machine learning to perform the incremental adaptive modification of a VR image 110 and, specifically, the model 115 according to one or more embodiments of the invention. This is further detailed with reference to FIG. 2.

Figure 2:
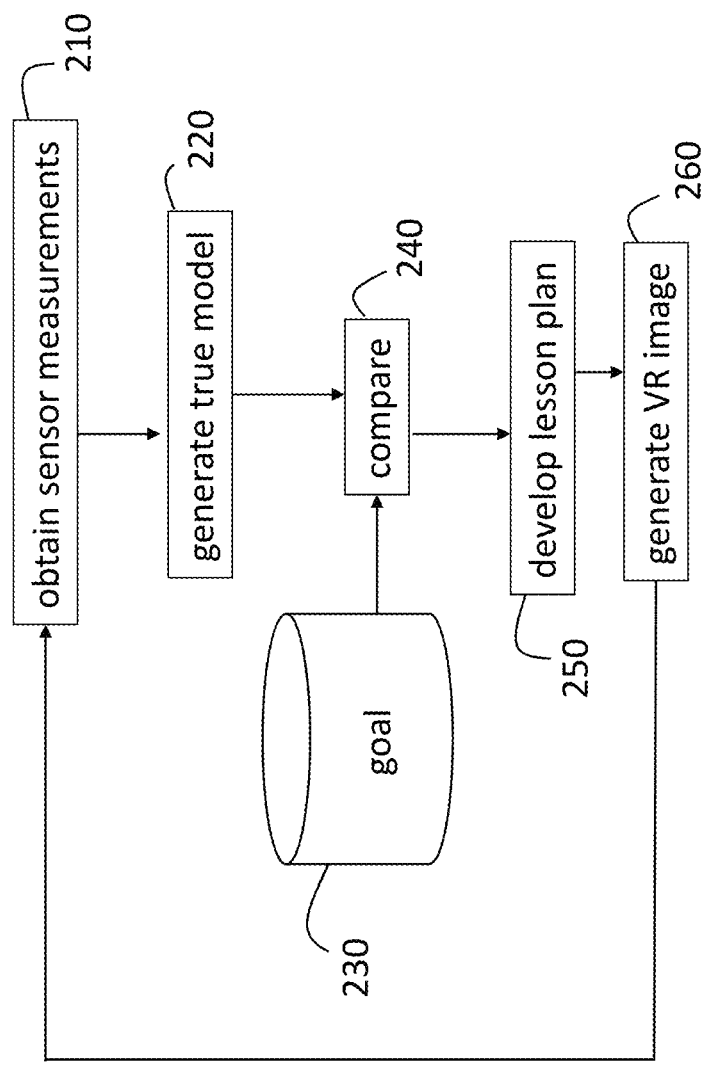
FIG. 2 is a process flow of a method of performing incremental adaptive modification of a VR image according to one or more embodiments of the invention.

FIG. 2 is a process flow of a method of performing incremental adaptive modification of a VR image 110 and, more specifically, a model 115 of a VR participant 120 in the VR image 110 according to one or more embodiments of the invention. At block 210, obtaining sensor 130 measurements includes obtaining measurements of muscle and other musculoskeletal movements from the VR participant 120. At block 220, generating a true model refers to modeling the VR participant 120 using the measurements obtained from the sensors 130 (at block 210). General information, such as height, about the VR participant 120 can additionally be obtained by the VR system 100 to generate the true model at block 220. This true model is compared with goal information at block 240. The goal information represents the action or position that the VR participant 120 would ideally take. For example, if the VR participant 120 is playing a guitar, the goal information can indicate the ideal finger positions, or if the VR participant 120 is doing an exercise (e.g., for physical therapy), the goal information can indicate the ideal movements.

A database 230 can be included in the controller 140 of the VR system 100 to store the goal information. The goal information can be in a number of different forms and can be obtained by different methods from different sources. According to an exemplary embodiment of the invention, the goal information is obtained from a video recording of an expert (e.g., a renowned guitarist playing the same music, a physical therapist demonstrating the exercises to be performed). According to other exemplary embodiments, an expert (e.g., instructor, physical therapist) can wear sensors 130 and the goal information can be an expert model generated from the measurements by those sensors 130 or the measurements themselves. At block 240, comparing the true model (generated at block 220) with the goal information requires the goal information to be in the same coordinate system as the true model. In addition, if the goal information is not in the form of an expert model, then an expert model can be generated in the same coordinate system as the true model. Developing a lesson plan, at block 250, is based on a result of the comparison (at block 240).

Typically, the expert model is not immediately presented as the model 115 in the VR image 110. This is because, when VR participants 120 perceive too drastic a difference between their own positions or actions, according to proprioception, and those of the model 115 that they see in the VR image 110, the body transfer illusion can be negatively impacted. If the VR participant 120 no longer takes ownership of the model 115 displayed in the VR image 110, then the training aspect becomes more challenging. Thus, incremental differences between the position or action of the true model obtained from measurements of the VR participant 120 and the expert model obtained from the goal information are used to generate the model 115 displayed in the VR image 110 according to a lesson plan developed at block 250. The VR participant 120 is likely to adopt changes in position or actions to match the model 115 seen in the VR image 110. That is, the body transfer illusion gives rise to the need to match proprioception (of one's own actions) with visual cues obtained from the model 115 in the VR image 110 and is advantageously applied to incrementally train the VR participant 120 with the lesson plan developed at block 250, according to one or more embodiments of the invention.

At block 250, developing the lesson plan can be implemented through machine learning. It bears noting that the true model can match the expert model or be closer to the expert model in some aspects than in others (e.g., left hand of true model does not match fret positions of expert model but right hand of true model matches strumming by expert model in guitar example). In addition, certain aspects of the differences may be irrelevant even if sensor 130 measurements are obtained (e.g., position of feet of true model versus expert model in the guitar example). Thus, the lesson plan developed at block 250 can involve modifying some aspects of the true model differently than other aspects of the true model to generate the model 115 for display in the VR image 110. Additionally, data about the VR participant 120 (e.g., age, health conditions) about the VR participant 120 can be available to the controller 140 and can include information about their physical ability that requires additional modification to the model 115 that is generated in view of the expert model. That is, the path along the natural gradient within the coordinate system of the true model to the expert model can be adjusted based on the data about the VR participant 120.

According to one or more embodiments of the invention, this data about the VR participant 120 can affect the selection of the goal information from the database 230 for comparison (at block 240) when more than one set of goal information (e.g., multiple videos of a guitarist playing a particular song) is available. That is, a different expert model can be used based on the data about the VR participant 120. Historical data regarding learning patterns of other users can additionally be used to determine the amount of error to induce between the true model and the model 115 displayed in the VR image 110 at each iteration. At block 250, developing the lesson plan can involve using a gradient descent procedure according to a relatively simple embodiment of the invention. According to this procedure, the model 115 shown in the VR image 110 is incrementally modified to be closer to the expert model. As shown in FIG. 2, the lesson plan, developed at block 250, is used to generate the VR image 110 and, specifically, the model 115 of the VR participant 120 in the VR image 110.

As also shown, the processes are performed iteratively. This facilitates adjustment of the lesson plan in subsequent iterations. Thus, the modification of the model 115 displayed in the VR image 110 is both incremental, according to the gradient determined for the lesson plan, and adaptive from one iteration to the next. Adjustment of the lesson plan can be based on a number of factors. For example, subsequent measurements obtained at block 210 and compared, at block 240, can be used as feedback to adjust the lesson plan, at block 250, in subsequent iterations. If the VR participant 120 is adjusting actions or positions to match those of the model 115 more quickly than anticipated, the gradient can be adjusted such that the lesson plan progresses to the expert model in fewer iterations. On the other hand, if the measurements (at block 210) indicate that the VR participant is adjusting actions or positions to match those of the model 115 more slowly than anticipated, then the path along the gradient can be adjusted to add more iterations to the lesson plan. According to embodiments of the invention, the words "path along the gradient" does not imply a monotonic function per se (as it may in the literature pertaining to gradient descent/ascent methods and optimization), but instead means a path along the gradient that can include slight deviations from monotonicity for the purposes described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing incremental adaptive modification of a virtual reality image, the computer-implemented method comprising:
    obtaining, using a processor, sensor measurements from sensors coupled to an individual who is performing a task while viewing the virtual reality image;
    generating, using the processor, a true model of the individual from the sensor measurements;
    comparing the true model with an expert model obtained from another individual performing the task;
    developing a lesson plan based on determining a difference between the true model and the expert model, wherein the developing the lesson plan includes determining a gradient of intermediate models within the difference; and
    iteratively including a different one of the intermediate models along the gradient from the true model to the expert model in the virtual reality image.

2. The computer-implemented method according to claim 1, wherein the obtaining the sensor measurements includes obtaining measurements of mechanical musculoskeletal movement.

3. The computer-implemented method according to claim 1 further comprising generating the expert model based on a video of the another individual performing the task.

4. The computer-implemented method according to claim 1 further comprising generating the expert model based on obtaining expert sensor measurements from the another individual performing the task.

5. The computer-implemented method according to claim 1, wherein the developing the lesson plan includes adjusting the gradient based on data specific to the individual.

6. The computer-implemented method according to claim 1 further comprising adaptively changing the lesson plan between iterations based on feedback from the sensor measurements.

7. The computer-implemented method according to claim 1, wherein the developing the lesson plan is performed using machine learning and historical data.

8. A system to perform incremental adaptive modification of a virtual reality image, the system comprising:
    one or more sensors configured to provide sensor measurements from an individual who is performing a task while viewing the virtual reality image; and
    a processor configured to generate a true model of the individual from the sensor measurements, to compare the true model with an expert model obtained from another individual performing the task, to develop a lesson plan based on a difference between the true model and the expert model by determining a gradient of intermediate models within the difference; and to iteratively include a different one of the intermediate models along the gradient from the true model to the expert model in the virtual reality image.

9. The system according to claim 8, wherein the one or more sensor obtain measurements of mechanical musculoskeletal movement of the individual.

10. The system according to claim 8, wherein the processor is further configured to generate the expert model based on a video of the another individual performing the task.

11. The system according to claim 8, wherein the processor is further configured to generate the expert model based on obtaining expert sensor measurements from the another individual performing the task.

12. The system according to claim 8, wherein the processor is further configured to adjust the gradient based on data specific to the individual to generate the lesson plan.

13. The system according to claim 8, wherein the processor is further configured to adaptively change the lesson plan between iterations based on feedback from the sensor measurements.

14. The system according to claim 8, wherein the processor is configured to implement machine learning to develop the lesson plan.

15. A computer program product for performing incremental adaptive modification of a virtual reality image, the computer program product comprising a computer readable storage medium having program instructions embodied therewith, the program instructions executable by a processor to perform a method comprising:
    obtaining sensor measurements from an individual who is performing a task while viewing the virtual reality image;
    generating a true model of the individual from the sensor measurements;
    comparing the true model with an expert model obtained from another individual performing the task;
    developing a lesson plan based on determining a difference between the true model and the expert model, wherein the developing the lesson plan includes determining a gradient of intermediate models within the difference; and
    iteratively including a different one of the intermediate models along the gradient from the true model to the expert model in the virtual reality image.

16. The computer program product according to claim 15, wherein the obtaining the sensor measurements includes obtaining measurements of mechanical musculoskeletal movement.

17. The computer program product according to claim 15 further comprising generating the expert model based on a video of the another individual performing the task or based on obtaining expert sensor measurements from the another individual performing the task.

18. The computer program product according to claim 15, wherein the developing the lesson plan includes adjusting the gradient based on data specific to the individual.

19. The computer program product according to claim 15 further comprising adaptively changing the lesson plan between iterations based on feedback from the sensor measurements.

20. The computer program product according to claim 15, wherein the developing the lesson plan is performed using machine learning and historical data.

\* \* \* \* \*